(12) United States Patent
Kato

(10) Patent No.: US 12,380,529 B2
(45) Date of Patent: Aug. 5, 2025

(54) NON-TRANSITORY COMPUTER-READABLE STORAGE MEDIUM STORING IMAGE PROCESSING PROGRAM, IMAGE PROCESSING SYSTEM, IMAGE PROCESSING APPARATUS, AND IMAGE PROCESSING METHOD

(71) Applicant: NINTENDO CO., LTD., Kyoto (JP)

(72) Inventor: Ayumu Kato, Kai (JP)

(73) Assignee: Nintendo Co., Ltd., Kyoto (JP)

( * ) Notice: Subject to any disclaimer, the term of this patent is extended or adjusted under 35 U.S.C. 154(b) by 428 days.

(21) Appl. No.: 18/107,339

(22) Filed: Feb. 8, 2023

(65) Prior Publication Data
US 2024/0037695 A1 Feb. 1, 2024

(30) Foreign Application Priority Data

Jul. 28, 2022 (JP) .................................. 2022-120844

(51) Int. Cl.
*G06T 1/60* (2006.01)
*G06T 15/50* (2011.01)

(52) U.S. Cl.
CPC .............. *G06T 1/60* (2013.01); *G06T 15/503* (2013.01)

(58) Field of Classification Search
CPC ......... G06T 1/60; G06T 15/00; G06T 15/005; G06T 15/10; G06T 15/20; G06T 15/205; G06T 15/40; G06T 15/80; G06T 15/503; G06T 15/506
See application file for complete search history.

(56) References Cited

U.S. PATENT DOCUMENTS

| | | | | |
|---|---|---|---|---|
| 11,176,637 | B2* | 11/2021 | Bastani | G06F 3/011 |
| 11,410,331 | B2* | 8/2022 | Kassis | G06T 19/006 |
| 12,141,935 | B2* | 11/2024 | Bastani | G06T 11/00 |
| 2013/0109468 | A1 | 5/2013 | Okamura | |
| 2022/0375124 | A1* | 11/2022 | Kassis | H04N 7/15 |
| 2023/0325908 | A1* | 10/2023 | Lee | G06Q 40/06 |
| | | | | 705/14.23 |

FOREIGN PATENT DOCUMENTS

| | | |
|---|---|---|
| JP | 2000-235589 | 8/2000 |
| JP | 2013-94303 | 5/2013 |
| JP | 2020-189064 | 11/2020 |

* cited by examiner

*Primary Examiner* — Vijay Shankar
(74) *Attorney, Agent, or Firm* — Nixon & Vanderhye PC

(57) ABSTRACT

An exemplary image processing system first writes normal line information and color information into the G buffer and depth information into the depth buffer for a first object. Next, at a time of writing the normal line information into the G buffer for a second object, the exemplary image processing system calculates a difference between the depth information of a first object and the depth information of the second object, and blends the normal line information of the first object with the normal line information of the second object based on the difference, and writes the blended normal line information into the G buffer. The exemplary image processing system then renders an image in a frame buffer based on information stored in the G buffer and light source information.

26 Claims, 9 Drawing Sheets

FIG. 5
(Step 2-1) Calculate depth value difference.
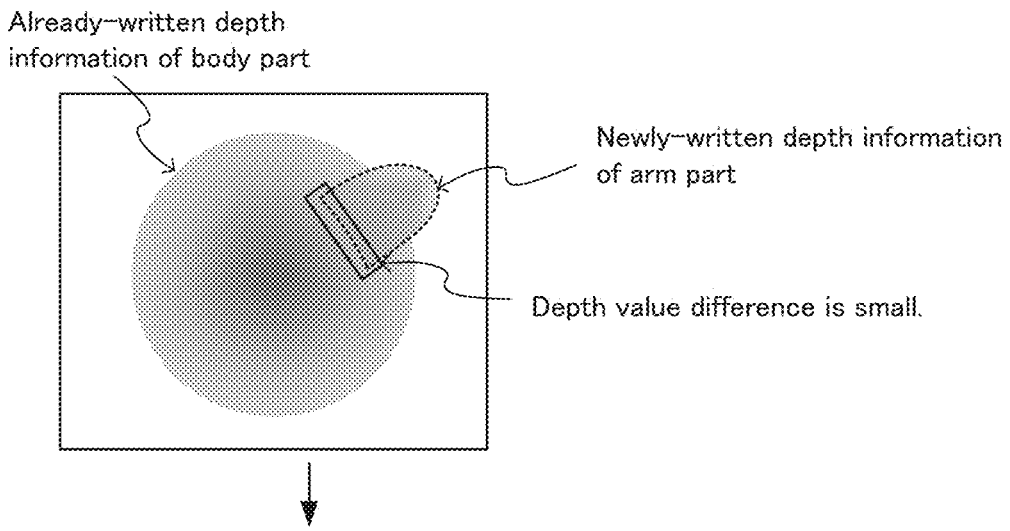
(Step 2-2) Writing of normal line information of arm part into G buffer.
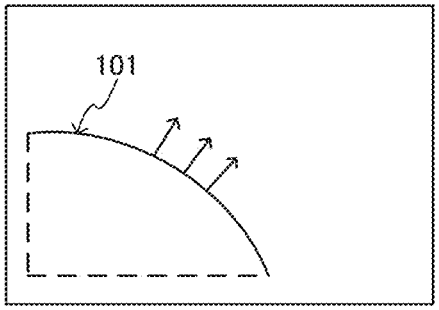
Already-written normal line information of a part of body part
(a) Newly-written normal line information of arm part (without blend processing)
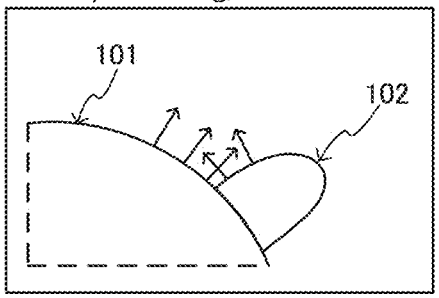
(b) Blending performed according to depth value difference when writing in arm part
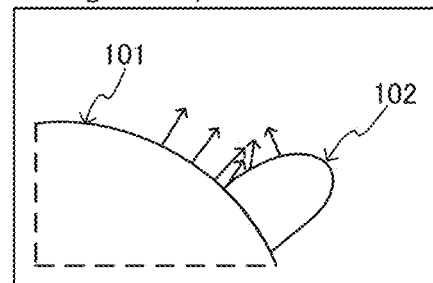

FIG. 6
WITHOUT BLENDING OF
NORMAL LINE INFORMATION
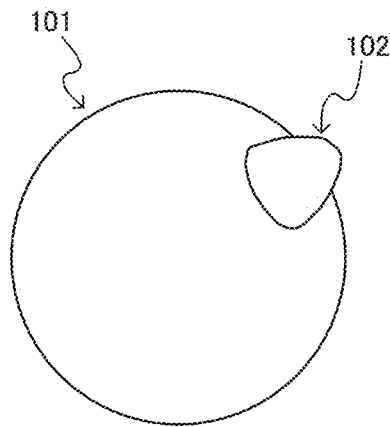
WITH BLENDING OF NORMAL
LINE INFORMATION
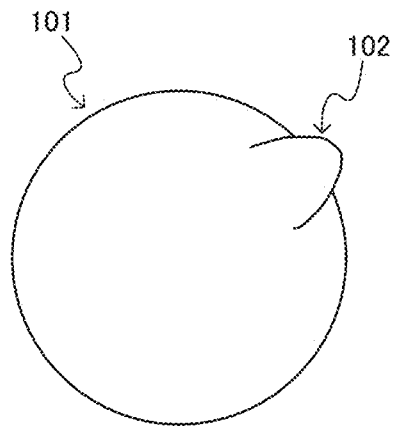

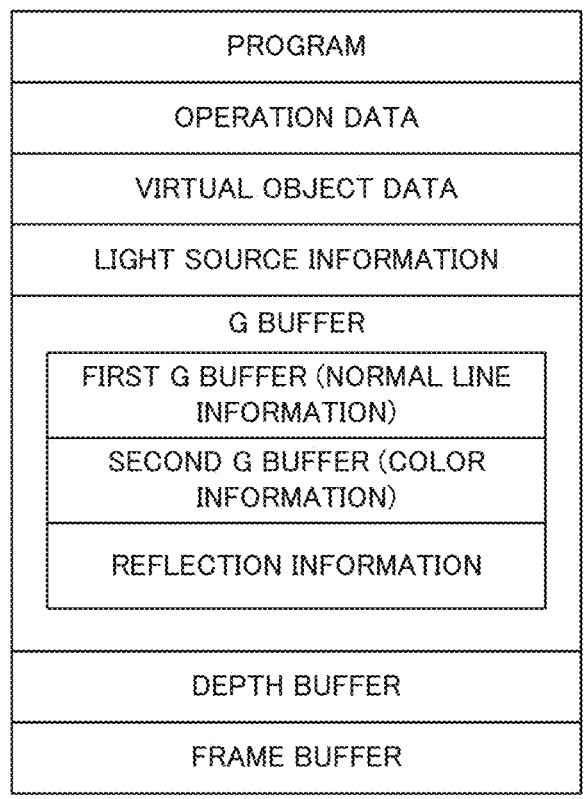
F I G. 7

NON-TRANSITORY COMPUTER-READABLE STORAGE MEDIUM STORING IMAGE PROCESSING PROGRAM, IMAGE PROCESSING SYSTEM, IMAGE PROCESSING APPARATUS, AND IMAGE PROCESSING METHOD

CROSS REFERENCE TO RELATED APPLICATION

This application claims priority to Japanese Patent Application No. 2022-120844 filed on Jul. 28, 2022, the entire contents of which are incorporated herein by reference.

FIELD

An exemplary embodiment relates to a non-transitory computer-readable storage medium storing an image processing program capable of generating an image of an object in a virtual space, and relates to an image processing system, an image processing apparatus, and an image processing method.

BACKGROUND AND SUMMARY

To date, there has been an image processing system that arranges, for example, an object having a protrusion in a virtual space and generates an image of the object.

When an image of such an object having a protrusion is generated, a connecting portion of the protrusion may be conspicuous, and there is room for improvement to achieve natural appearance of the connecting portion.

Therefore, an object of the exemplary embodiment is to provide a non-transitory computer-readable storage medium storing an image processing program capable of generating an image with natural appearance of a connecting portion of an object, and to provide an image processing system, an image processing apparatus, and an image processing method.

To achieve the above-described object, this exemplary embodiment adopts a configuration as described below.

(First Configuration)

An image processing program of the first configuration causes the computer of an information processing apparatus to generate an image of an object in a virtual space based on deferred rendering. The image processing program causes the computer to perform first processing including at least writing of depth information of a first object into a depth buffer, writing of normal line information of the first object into a first buffer, and writing of color information of the first object into a second buffer. After the first processing, the image processing program causes the computer to: perform a depth test on a second object in the virtual space and second processing including at least writing of the depth information of the second object into the depth buffer, writing of the normal line information of the second object into the first buffer, and writing of the color information of the second object into the second buffer; at a time of writing the normal line information of the second object into the first buffer in the second processing, write the normal line information of the second object into the first buffer so that, based on a difference between the depth information of the second object and the depth information already stored in the depth buffer, the normal line information of the second object is blended with the normal line information already stored in the first buffer for a portion where the difference is small. Then, the image processing program causes the computer to generate an image by rendering based on information stored in at least the first buffer and the second buffer.

According to the above, the normal line information of the second object is written into the first buffer so that, for a portion where the depth information is close to the first object, the normal line information of the first object is blended with the normal line information of the second object. This allows generation of an image in which the connecting portion between the first object and the second object is not conspicuous and appears naturally.

(Second Configuration)

A second configuration may be the above first configuration adapted so as to cause the computer to write blended normal line information into the first buffer at a time of writing the normal line information of the second object into the first buffer, the blended normal line information obtained by blending the normal line information of the second object with the normal line information already stored in the first buffer at a blend ratio according to the difference.

According to the above, since the blend ratio is set according to the difference in the depth information, the normal line information of the first object and the normal line information of the second object can be blended more naturally.

(Third Configuration)

A third configuration may be the second configuration adapted so that the blend ratio is set so that a proportion of the normal line information already stored in the first buffer increases with a decrease in the difference.

According to the above, the proportion of the normal line information already stored in the first buffer increases with a decrease in the difference in the depth information. Therefore, the normal line information of the second object can be brought closer to the normal line information of the first object for the portion where the difference in the depth information is small, at a time of writing the normal line information of the second object into the first buffer. This allows the second object to fit in with the first object.

(Fourth Configuration)

A fourth configuration may be the first configuration adapted so that the image processing program causes the computer to write blended normal line information into the first buffer at a time of writing the normal line information of the second object into the first buffer, the blended normal line information obtained by blending the normal line information of the second object with the normal line information already stored in the first buffer at a predetermined blend ratio for a pixel where the difference is within a predetermined range.

According to the above, the normal line information of the second object and the normal line information of the first object can be blended at a predetermined ratio for a pixel where the difference in the depth information is within the predetermined range.

(Fifth Configuration)

A fifth configuration may be any one of the first to fourth configurations adapted so as to cause the computer to, at a time of writing the color information of the second object into the second buffer, write the color information of the second object into the second buffer so that, based on the difference, the color information of the second object is blended with the color information already stored in the second buffer for the portion where the difference is small.

According to the above, it is possible to blend the color information of the second object with the color information of the first object.

(Sixth Configuration)

A sixth configuration may be any one of the first to fifth configurations adapted so that the first object is a first part of a character, and the second object is a second part of the character.

According to the above, it is possible to achieve a less conspicuous connecting portion between the first part and the second part of the character.

(Seventh Configuration)

An image processing program of the first configuration causes a computer of the information processing apparatus to generate an image of an object in a virtual space. The image processing program causes the computer to perform first processing including at least writing of depth information of a first object into a depth buffer, writing of normal line information of the first object into a normal line buffer, and drawing of the first object into a frame buffer. After the first processing, the image processing program causes the computer to perform a depth test on a second object in the virtual space and second processing including drawing of the second object in the frame buffer; and in the drawing of the second object in the frame buffer in the second processing, calculate normal line information so that, based on a difference between the depth information of the second object and the depth information already stored in the depth buffer, the normal line information of the second object is blended with the normal line information already stored in the normal line buffer for a portion where the difference is small and perform rendering based on the calculated normal line information.

According to the above, the normal line information of the first object and the normal line information of the second object are blended for a portion where the depth information is close to the first object, and the image is rendered based on the blended normal line information. This allows generation of an image in which the connecting portion between the first object and the second object is not conspicuous.

Further, another exemplary embodiment may be an image processing system, an image processing apparatus, or an image processing method.

According to this exemplary embodiment, it is possible to generate an image in which the connecting portion between the first object and the second object is not conspicuous and appears naturally.

These and other objects, features, aspects and advantages will become more apparent from the following detailed description when taken in conjunction with the accompanying drawings.

BRIEF DESCRIPTION OF THE DRAWINGS

FIG. 5 is an example non-limiting diagram providing a conceptual representation of processing performed at a time of writing an arm part 102 into a G buffer in step 2 of FIG. 4.

FIG. 6 is an example non-limiting diagram providing a conceptual representation of an image of the virtual object 100 in a case where the blend processing is not performed and an image of the virtual object 100 in a case where the blend processing is performed.

FIG. 7 is an example non-limiting diagram showing exemplary data stored in a memory of the main body apparatus 2 while game processing is executed.

DETAILED DESCRIPTION OF NON-LIMITING EXAMPLE EMBODIMENTS (System Configuration)

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies. Hereinafter, first, the hardware configuration of the game system 1 according to the exemplary embodiment is described, and then, the control of the game system 1 according to the exemplary embodiment is described.

Figure 1:
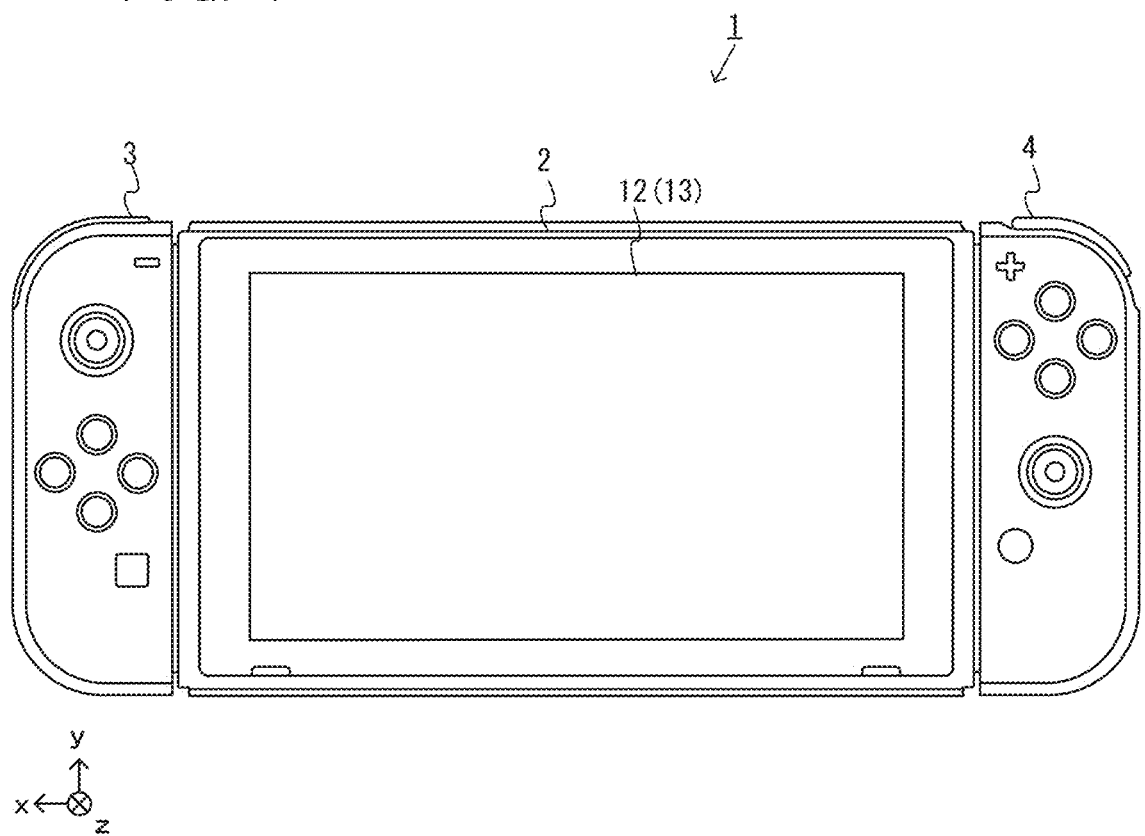
FIG. 1 is an example non-limiting diagram showing an exemplary state where a left controller 3 and a right controller 4 are attached to a main body apparatus 2.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

The left controller 3 and the right controller 4 are attachable to and detachable from the main body apparatus 2. It should be noted that hereinafter, the left controller 3 and the right controller 4 will occasionally be referred to collectively as a "controller".

The main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

Figure 2:
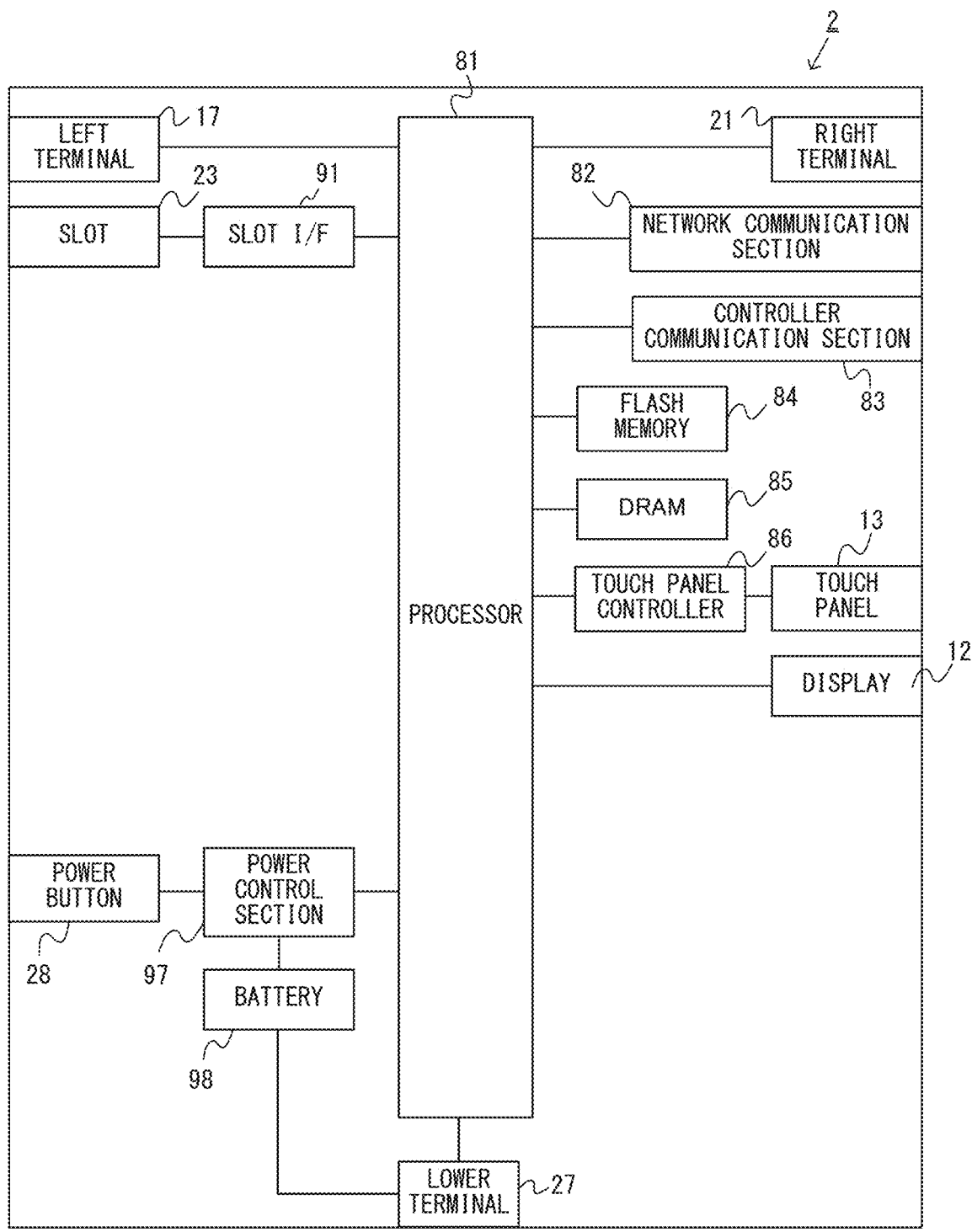
FIG. 2 is an example non-limiting block diagram showing an exemplary internal configuration of the main body apparatus 2.

FIG. 2 is a block diagram showing an example of the internal configuration of the main body apparatus 2.

The main body apparatus 2 includes a processor 81. The processor 81 is an information processing section for executing various types of information processing to be executed by the main body apparatus 2. The processor 81 includes a CPU (Central Processing Unit) and a GPU (Graphics Processing Unit). The processor 81 may be composed of an SoC (system-on-a-chip) having a plurality of functions such as a CPU function and a GPU function. It should be noted that the CPU and the GPU may be configured as separate processors. Further, the processor 81 is provided therein with a memory that temporarily stores data. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication).

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to a stationary monitor or the like via the cradle.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

The main body apparatus 2 includes a power control section 97 and a battery 98. The power control section 97 is connected to the battery 98 and the processor 81. Further, although not shown, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

(Overview of Image Generation Processing)

Image generation processing of this exemplary embodiment is described below. The game system 1 according to this exemplary embodiment (an exemplary image processing system) arranges a virtual object in a three-dimensional virtual space, and performs a game using the virtual object. The game system 1 generates, based on the virtual camera, an image of the virtual space including the virtual object and outputs the generated image to the display 12 or the stationary monitor (hereinafter, "display device"). The following is an overview of the image generation processing performed in the game system 1 of this exemplary embodiment.

Figure 3:
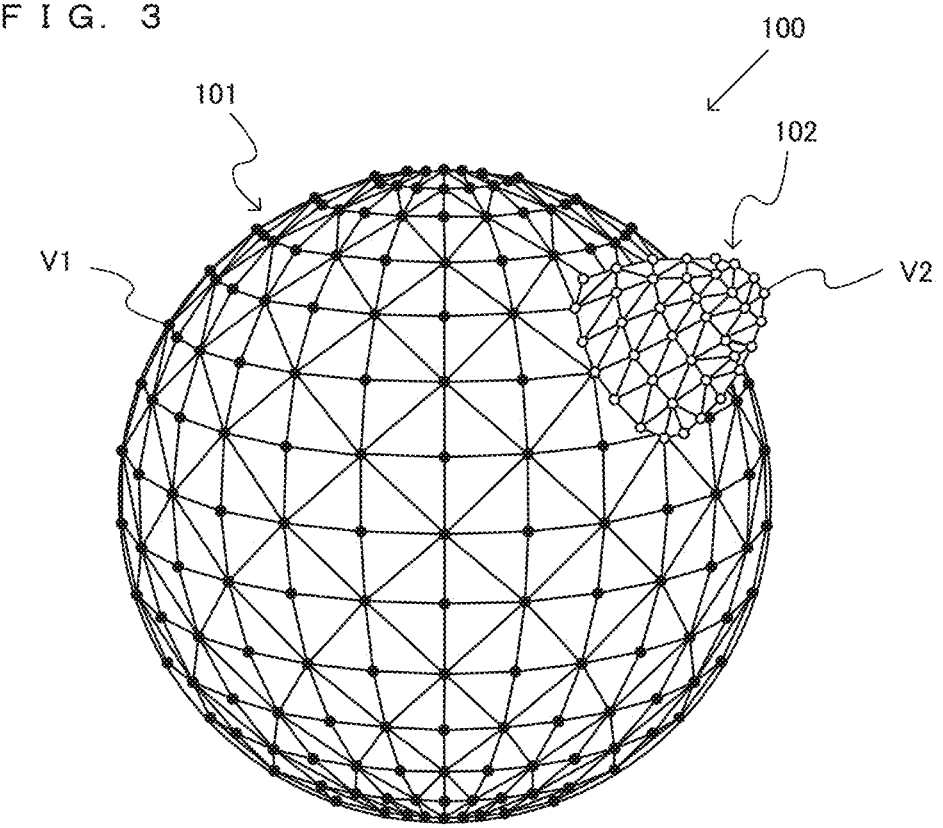
FIG. 3 is an example non-limiting diagram showing a three-dimensional model representing a virtual object 100 arranged in a virtual space.

FIG. 3 is a diagram showing an example of a three-dimensional model representing a virtual object 100 arranged in a virtual space. The virtual object 100 is a character object in the virtual space. For example, the character is a user-controllable player character. It should be noted that the virtual object 100 may be a non-player character controlled automatically by the processor 81.

The virtual object 100 includes a body part 101 and an arm part 102 connected to the body part 101. The body part 101 includes a plurality of vertices V1 (black circles in FIG. 3), and the plurality of vertices V1 forms a generally spherical shape. The arm part 102 includes a plurality of vertices V2 (white circles in FIG. 3). For example, the arm part 102 has an oblong oval shape cut in half, with its distal end having a round and slightly pointed shape. A proximal portion of the arm part 102 is connected to and contacts the spherical surface of the body part 101. It should be noted that FIG. 3 shows only one arm part 102, however, another arm part 102 is provided on the opposite side of the body part 101. The virtual object 100 may include other parts (such as a leg part) in addition to the body part 101 and the arm part 102, but these parts will be omitted here for the sake of description.

For example, the virtual object 100 moves in the virtual space and makes certain actions in response to user operation. For example, the arm part 102 of the virtual object 100 makes a motion based on an animation in response to user operation or the like. Specifically, while the proximal portion of the arm part 102 is in contact with the spherical surface of the body part 101, the arm part 102 moves on the spherical surface of the body part 101, and the posture of the arm part 102 changes with respect to the body part 101.

The virtual object 100 shown in FIG. 3 is arranged in the virtual space. In the virtual space, a virtual camera, one or more light sources, the virtual object 100, and other objects (e.g., objects fixed in the virtual space, enemy objects capable of moving in the virtual space, etc.) are arranged. By the processor 81 performing the image generation processing, an image of the virtual object 100 viewed from the virtual camera is generated and displayed on the display device. The image generation processing adds shading based on the light source set in the virtual space.

Figure 4:
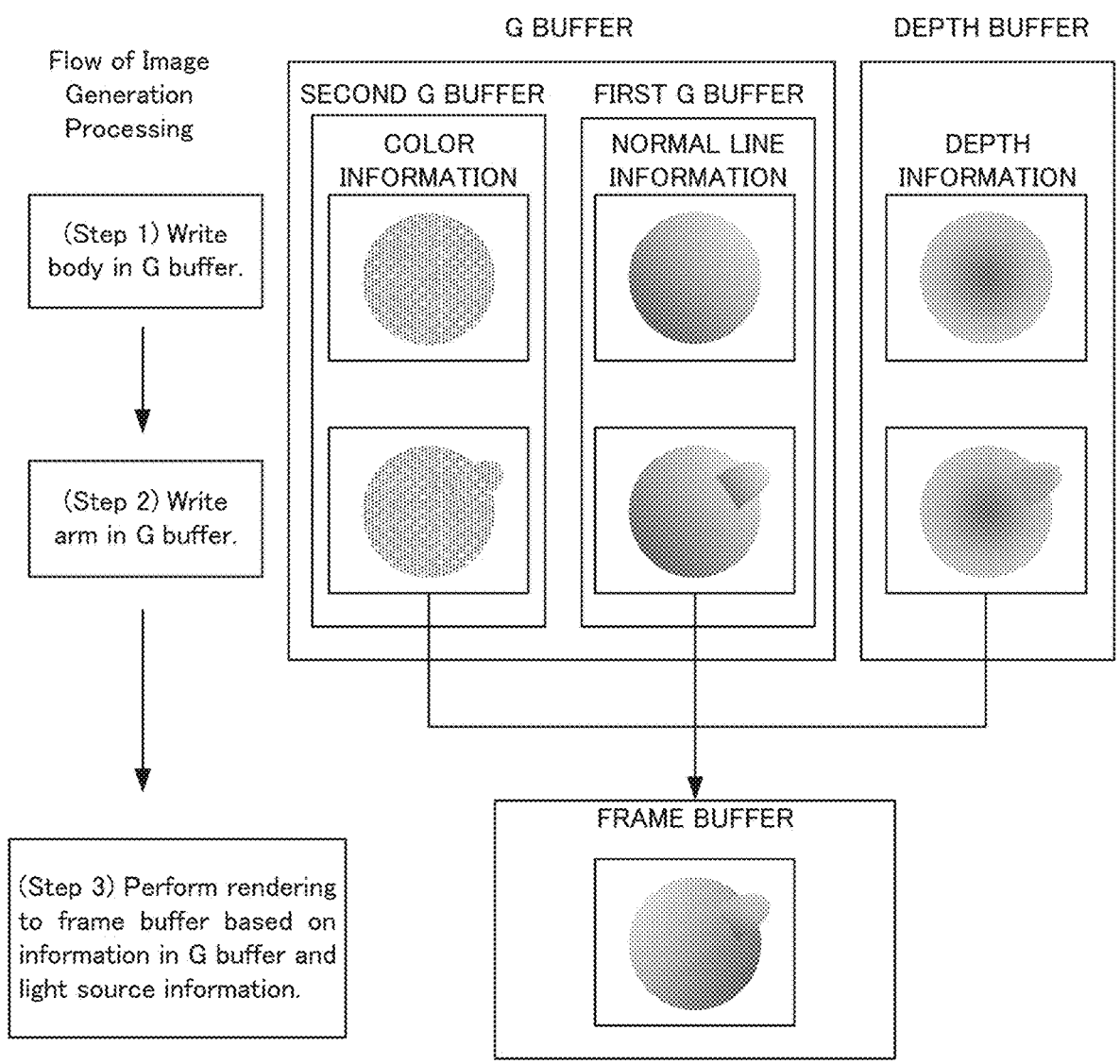
FIG. 4 is an example non-limiting diagram showing an overview of image generation processing of this exemplary embodiment.

FIG. 4 is a diagram showing an overview of the image generation processing of this exemplary embodiment. FIG. 4 illustrates a flow of processing in which the processor 81 (specifically, a GPU) renders the virtual object 100 including the body part 101 and the arm part 102 in a frame buffer. In this exemplary embodiment, for example, deferred rendering (also referred to as deferred shading) is adopted as a rendering method.

As shown in FIG. 4, the processor 81 generates an image using a G buffer (Geometry Buffer) and a depth buffer. The G buffer and the depth buffer are, for example, a storage area which is a part of a memory within the processor 81 or the DRAM 85. The G buffer includes a first G buffer which stores normal line information and a second G buffer which stores color information. In the first G buffer, the normal line information for each pixel at a time of generating an image is stored. That is, when a point P on the surface of the virtual object 100 arranged in the virtual space is projected onto an image plane, the point P on the virtual object 100 is associated with a specific pixel Ep on the image plane and the normal line information of the point P is stored in relation to that pixel Ep. Specifically, x, y, and z coordinate values indicating the direction of the normal line are stored as the normal line information.

Further, in the second G buffer, the color information for each pixel is stored. Further, reflection information (specular), roughness, and the like are stored in the G buffer.

Further, the depth buffer stores depth information indicating a depth value of each pixel (a value indicating the depth when viewed from the virtual camera).

Specifically, in step 1, the processor 81 writes the body part 101 into the G buffer. More specifically, the processor 81 writes the normal line information of the body part 101 into the first G buffer and writes the color information of the body part 101 into the second G buffer. Although FIG. 4 shows a black-and-white circular image as the normal line information of the body part 101, it indicates the normal direction of each pixel in the form of grayscale of that pixel. It should be noted that this image is only a conceptual representation of the normal line information stored in the first G buffer as an image, and not an accurate representation of the normal direction of each pixel in the form of grayscale of that pixel.

Further, the color information of the body part 101 written into the second G buffer is color information set in advance for the body part 101, and is information related to a color determined irrespective of the light source, reflection, or the like. The color information includes information related to a base color (also called "albedo" or diffuse reflected light). For example, the color information may be an RGB value. The color information of each pixel is written into the second G buffer. For example, in a case where the body part 101 is spherical and is red, a red circle is written into the second G buffer as the color information of the body part 101. Meanwhile, in a case where the body part 101 is spherical and has a pattern (texture) on its spherical surface, a circle having that pattern is written into the second G buffer as the color information of the body part 101.

Further, in step 1, the processor 81 writes the depth information of the body part 101 into the depth buffer. The depth information of the body part 101 is information related to the depth value of each pixel. Based on the positions of the points of the body part 101 on its surface and the position of the virtual camera, the processor 81 calculates the depth values for each pixel of the body part 101 and writes the calculated depth values into the depth buffer. It should be noted that FIG. 4 shows a black-and-white circular image as the depth information of the body part 101. This is a representation of the magnitude of the depth value of each pixel stored in the depth buffer in the form of grayscale of that pixel. For example, in case where the depth value increases with an increase in the distance from the virtual camera, the color of the pixel becomes brighter with an increase in the depth value and the color of the pixel becomes darker with a decrease in the depth value, in FIG. 4.

Next, in step 2, the processor 81 writes the arm part 102 into the G buffer. Specifically, the processor 81 writes the color information of the arm part 102 into the second G buffer. Further, the processor 81 writes the normal line information of the arm part 102 into the first G buffer. Further, the processor 81 writes the depth information of the arm part 102 into the depth buffer. Here, the processor 81 performs blend processing based on the depth information at a time of writing the normal line information of the arm part 102 into the first G buffer in step 2. Details of step 2 will be described later.

Next, in step 3, the processor 81 performs rendering to the frame buffer based on the information written into the G buffer and the light source information. In addition to this information, the rendering in step 3 is performed by using the reflection information, roughness, and the like. Then, an image rendered in the frame buffer is output to the display device and displayed.

The details of step 2 above will now be described. FIG. 5 is a diagram providing a conceptual representation of processing performed at a time of writing the arm part 102 into the G buffer in step 2 of FIG. 4.

As shown in FIG. 5, at the time of writing the normal line information of the arm part 102 into the G buffer, the processor 81 first calculates a difference between the depth value of the body part 101 and the depth value of the arm part 102 as step 2-1. Specifically, the processor 81 calculates, for each pixel, the difference between the depth value already stored in the depth buffer (i.e., the depth value of the body part 101) and the depth value of the newly written arm part 102. It should be noted that in FIG. 5, for the sake of clarity, the outline of the arm part 102 to be newly written into the depth buffer is shown as a dashed line. As shown in FIG. 5, the proximal portion of the arm part 102 is connected to the body part 101, and therefore the depth values of the body part 101 and the arm part 102 are close in the connecting portion. That is, the difference between the depth value of the body part 101 and the depth value of the arm part 102 is small in the vicinity of the connecting portion (the rectangular portion indicated by the solid line in FIG. 5). The greater the distance from the connecting portion, the greater the difference between the depth value of the body part 101 and the depth value of the arm part 102.

Next, in step 2-2, the processor 81 writes the normal line information of the arm part 102 into the first G buffer. Specifically, the processor 81 performs the blend processing that blends the normal line information already stored in the first G buffer (i.e., the normal line information of the body part 101) with the normal line information of the newly written arm part 102 according to the depth value difference calculated in step 2-1. The processor 81 performs the blend processing based on the depth value difference for each pixel.

Specifically, the processor 81 blends the normal line information already stored in the first G buffer with the normal line information of the arm part 102 so that the proportion of the normal line information already stored in the first G buffer increases with a decrease in the depth value difference, and writes the blended normal line information into the first G buffer. For example, the processor 81 calculates the blended normal line information so that the proportion of the normal line information already stored in the first G buffer is 100% for pixels having the depth value difference of "0". That is, the normal line information already stored in the first G buffer is maintained for the pixels with the depth value difference of "0". For pixels with the depth value difference between 0 and a predetermined value, the blended normal line information is calculated so that the smaller the depth value difference, the closer the blended normal line information becomes to the normal line information of the body part 101 already stored. For pixels with the depth value difference exceeding the predetermined value, the proportion of normal line information for the arm part 102 is 100%. That is, for pixels with the depth value difference exceeding the predetermined value, the normal line information already stored in the first G buffer is overwritten by the normal line information of the arm part 102.

For example, the processor 81 may calculate the normal line information of each pixel based on the following Formula 1, and write the calculated normal line information into the first G buffer.

Normal line information=Normal line information of the body part×$w$+Normal line information of the arm part×(1−$w$)  (Formula 1)

In the formula, w is the blend ratio, indicating the proportion of the normal line information of the body part 101. The value of w may be within a range of 0 to 1. For example, the value of w is 1 when the depth value difference is 0, and linearly varies according to the depth value difference within a range of 0 to a predetermined value. When the depth value difference exceeds the predetermined value, the value of W is 0. Further, the normal line information is the coordinate values of the x, y, and z axes indicating the normal direction. Thus, for pixels having a relatively small depth value difference, the normal line information of the body part 101 already stored in the first G buffer and the normal line information of the arm part 102 are blended and written into the first G buffer. The smaller the depth value difference, the closer the calculated normal direction becomes to the normal direction of the body part 101 already stored in the first G buffer.

It should be noted that, by "the normal line information of the body part 101 and the normal line information of the arm part 102 are blended", it means calculating a value between the normal line information of the body part 101 and the normal line information of the arm part 102, and encompasses, for example, calculating a linear interpolation between the normal line information of the body part 101 and the normal line information of the arm part 102. It should be noted that the method for blending the two values is not limited to linear interpolation, and any method may be used. For example, the normal line information of the body part 101 and the normal line information of the arm part 102 may be blended according to the depth value difference, based on a predetermined function. Further, for example, a plurality of blend ratios may be defined in advance according to the depth value difference, and the normal line information of the body part 101 and the normal line information of the arm part 102 may be blended at any of the blend ratios defined in advance.

Thus, the depth value difference is calculated for each pixel, and the blend processing is performed to blend the normal line information of the body part 101 with the normal line information of the arm part 102 based on the difference. This reduces the difference in the normal direction of the connecting portion between the body part 101 and the arm part 102. FIG. 5 is a diagram showing a direction indicated by the normal direction written into the first G buffer, when viewed in a lateral direction in the virtual space. (a) of FIG. 5 shows a case where the blend processing for the normal line information of the body part 101 and the normal line information of the arm part 102 is not performed. In this case, the arm part 102 is arranged so as to protrude from the surface of the body part 101. Therefore, the normal direction of the body part 101 and the normal direction of the arm part 102 are significantly different from each other in the connecting portion between the body part 101 and the arm part 102 and the angle formed by these normal directions is, for example, about 90 degrees.

On the other hand, in a case of performing the blend processing, the normal direction of the arm part 102 newly written into the first G buffer approximates to the normal direction of the body part 101 already stored in the first G buffer, in the connecting portion between the body part 101 and the arm part 102 as shown in (b) of FIG. 5. The normal line information newly written into the first G buffer becomes closer to the original normal line information of the arm part 102, with an increase in the distance from the connecting portion.

When an image is drawn in the frame buffer, a calculation related to shading is performed, based on the position and direction of the light source and the normal line information stored in the G buffer, to generate a shaded image. In the image generation processing of this exemplary embodiment, the normal line information of the body part 101 and the normal line information of the arm part 102 in the vicinity of the connecting portion between the body part 101 and the arm part 102 are blended. Therefore, in the vicinity of the connecting portion, the normal direction of the body part 101 and the normal direction of the arm part 102 becomes closer, and the shading of the connecting portion becomes closer. This allows a less conspicuous connecting portion between the body part 101 and the arm part 102, and allows the arm part 102 to fit in with the body part 101.

In addition to the normal line information, the color information may be subjected to blend processing through a method similar to the above-described method. Specifically, at a time of writing the color information of the arm part 102 into the second G buffer, a difference between the depth value of the arm part 102 and the depth value of the body part 101 stored in the depth buffer is calculated, and according to the difference, the color information of the body part 101 already stored in the second G buffer and the arm part 102 are blended, and the resulting blended color information is written into the second G buffer. Specifically, the color information of the body part 101 and the color information of the arm part 102 are blended so that the proportion of the already-stored color information of the body part 101 increases with a decrease in the depth value difference. This makes the color information of the body part 101 and the color information of the arm part 102 close to each other in the connecting portion, and allows the arm part 102 to fit in with the body part 101.

For example, the processor 81 may calculate the color information of each pixel based on the following Formula 2, and write the calculated color information into the second G buffer.

Color information=color information of body part× $w2$+color information of arm part×$(1-w2)$ (Formula 2)

In the formula $w2$ is a blend ratio, which indicates the proportion of the color information of the body part 101. For example, the value of $w2$ is 1 when the depth value difference is 0, and linearly varies according to the depth value difference within a range of to a predetermined value. When the depth value difference exceeds the predetermined value, the value of $w2$ is 0.

FIG. 6 is a diagram providing a conceptual representation of an image of the virtual object 100 in a case where the blend processing is not performed and an image of the virtual object 100 in a case where the blend processing is performed. The left side of FIG. 6 shows an image of the virtual object 100 in the case where the blend processing of the normal line information is not performed, whereas the right side of FIG. 6 shows an image of the virtual object 100 in the case where the blend processing of the normal line information is performed. As shown in FIG. 6, in the case where the blend processing of the normal line information is not performed, the connecting portion between the body part 101 and arm part 102 is relatively clear, although this may depend on the position and direction of the light source. This is because the shading of the body part 101 and the shading of the arm part 102 differ depending on the position and direction of the light source. On the other hand, in the case where the blend processing of the normal line information is performed, the normal directions in the vicinity of the connecting portion between the body part 101 and the arm part 102 become closer to each other. This blurs the connecting portion between the body part 101 and the arm part 102 irrespective of the position and direction of the light source, thus achieving an image in which these parts look smoothly connected. As a result, a natural image with a less conspicuous connecting portion between the body part 101 and the arm part 102 can be generated. The less conspicuous connecting portion between the body part 101 and the arm part 102 can be achieved even when the arm part 102 moves relative to the body part 101, and the arm part 102 can be fit in with the body part 101. That is, when the arm part 102 moves relative to the body part 101 during the game, the angle between the arm part 102 and the body part 101 may change from an acute angle to an obtuse angle; however, the normal line information is subjected to the blend processing as described above in the image generation processing, no matter how the relative position and posture of the arm part 102 and the body part 101 change. As a result, the normal directions in the vicinity of the connecting portion between the body part 101 and the arm part 102 become closer and an image with a less conspicuous connecting portion between the body part 101 and the arm part 102 can be generated.

It should be noted that the similar processing is also performed in a case of connecting a portion other than the arm part 102 (e.g., a leg part, a head part, and the like) to the body part 101. For example, after the body part 101 is written into the G buffer and at a time of writing a leg part into the G buffer, the difference between the depth information of the body part 101 and the depth information of the leg part is calculated. According to this difference, the normal line information of the body part 101 already stored in the first G buffer and the normal line information of the leg part are blended, and the resulting blended normal line information is written into the first G buffer. Then, rendering is performed based on the information written into the G buffer, the light source information, the reflection information, the roughness, and the like.

(Details of Image Generation Processing)

Next, the following describes details of image generation processing. First, data stored in the memory (the memory within the processor 81, the DRAM 85, the flash memory 84, an external storage medium, or the like) of the main body apparatus 2 will be described. FIG. 7 is a diagram showing exemplary data stored in a memory of the main body apparatus 2 while game processing is executed.

As shown in FIG. 7, the memory of the main body apparatus 2 (the memory in the processor 81, the DRAM 85, the flash memory 84, or the external storage medium or the like) stores a program, operation data, virtual object data, and light source information. The memory (e.g., the memory in the processor 81) includes the G buffer, the depth buffer, and the frame buffer. The G buffer has the first G buffer which stores the normal line information and the second G buffer which stores the color information. Further, the G buffer includes an area that stores the reflection information.

The program is a program for executing the later-described game processing. The program includes an image processing program for performing image generation processing, which will be described later. The program is stored in advance in the external storage medium mounted in the slot 23 or the flash memory 84 and is read into the DRAM 85 at a time of executing the game. The program may be obtained from another device via a network (e.g., the Internet).

The operation data is data related to operations obtained from the left controller 3 and the right controller 4. For example, the operation data is transmitted from the left controller 3 and the right controller 4 to the main body apparatus 2 at predetermined time intervals (e.g., at intervals of 1/200 sec), and is stored in the memory.

The virtual object data is data related to the virtual object 100 and includes data related to an exterior appearance such as the shape and the like of the virtual object 100. Specifically, the virtual object data includes data related to the shape of the body part 101 of the virtual object 100, data related to the shape of the arm part 102, data related to the color of the body part 101, data related to the color of the arm part 102, and the like. The virtual object data includes data related to the reflection information of the body part 101 and the arm part 102. The virtual object data includes data related to the position and direction of the virtual object 100 in the virtual space, as well as data related to the position and posture of the arm part 102 relative to the body part 101.

The light source information is information related to the light sources set in the virtual space. The light source information includes information related to the number of light sources, type, position, and direction of each light source. Note that, in this exemplary embodiment, the number of light sources, type, position, and direction of each light source varies depending on the scene of the game.

The G buffer includes the first G buffer that stores the normal line information and the second G buffer that stores the color information. Further, the reflection information is stored in the G buffer. Further, the depth information is stored in the depth buffer. Further, an image output to the display device is stored in the frame buffer.

(Details of Game Processing in Main Body Apparatus 2)

Figure 8:
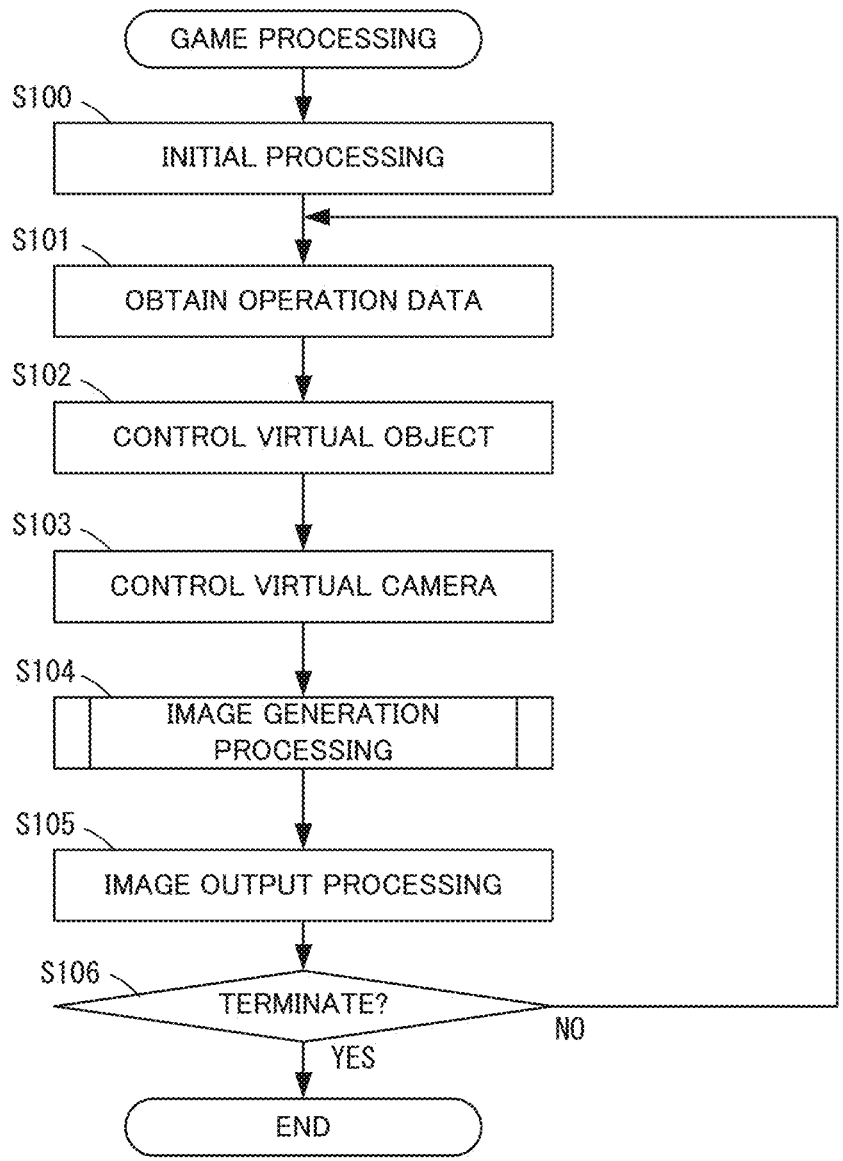
FIG. 8 is an example non-limiting flowchart showing exemplary game processing executed by a processor 81 of the main body apparatus 2.

Next, the following details the game processing performed in the main body apparatus 2. FIG. 8 is a flowchart showing exemplary game processing executed by the processor 81 of the main body apparatus 2.

As shown in FIG. 8, the processor 81 first executes initial processing (step S100). Specifically, the processor 81 sets a three-dimensional virtual space and arranges the virtual object 100, the virtual camera, the light sources, and various other objects used in the game in the virtual space. After executing the initial processing, the processor 81 repeats steps S101 to S106 at predetermined frame time intervals (e.g., at intervals of 1/60 sec).

In step S101, the processor 81 obtains operation data from the controller.

Next, the processor 81 performs control of the virtual object 100 based on the operation data obtained (step S102). The processor 81 causes the virtual object 100 to move in the virtual space or make a predetermined action based on the operation data. The processor 81 also causes the body part 101 and the arm part 102 of the virtual object 100 and the like to make a motion based on the operation data. Further, the processor 81 performs processing according to the control of the virtual object 100 (for example, processing according to predetermined actions).

Next, the processor 81 controls the virtual camera (step S103). The processor 81 controls the virtual camera so that the virtual object 100 is within the field of view of the virtual camera. For example, the processor 81 moves the virtual camera in the virtual space, changes the posture of the virtual camera, or the like in response to the movement of the virtual object 100. Further, the processor 81 may change the position and posture of the virtual camera based on the operation data.

Next, the processor 81 performs image generation processing (step S104). Here, an image is generated through the above-described method and stored in the frame buffer. The image generation processing of step S104 will be described in detail later.

Next, the processor 81 performs image output processing (step S105). Specifically, the processor 81 outputs the image stored in the frame buffer in step S104 to the display device (the display 12 or an external display device). Further, the processor 81 outputs audio according to the result of the processing in step S102.

The processor 81 then determines whether to terminate the game processing (step S106). For example, when termination of the game is instructed by the player, the processor 81 determines that the game processing is to be terminated (step S106: Yes) and terminates the game processing shown in FIG. 8. When the processor 81 determines not to terminate the game processing (step S106: NO), the processing of step S101 is executed again. This is the end of the description of the game processing shown in FIG. 8.

(Image Generation Processing)

Figure 9:
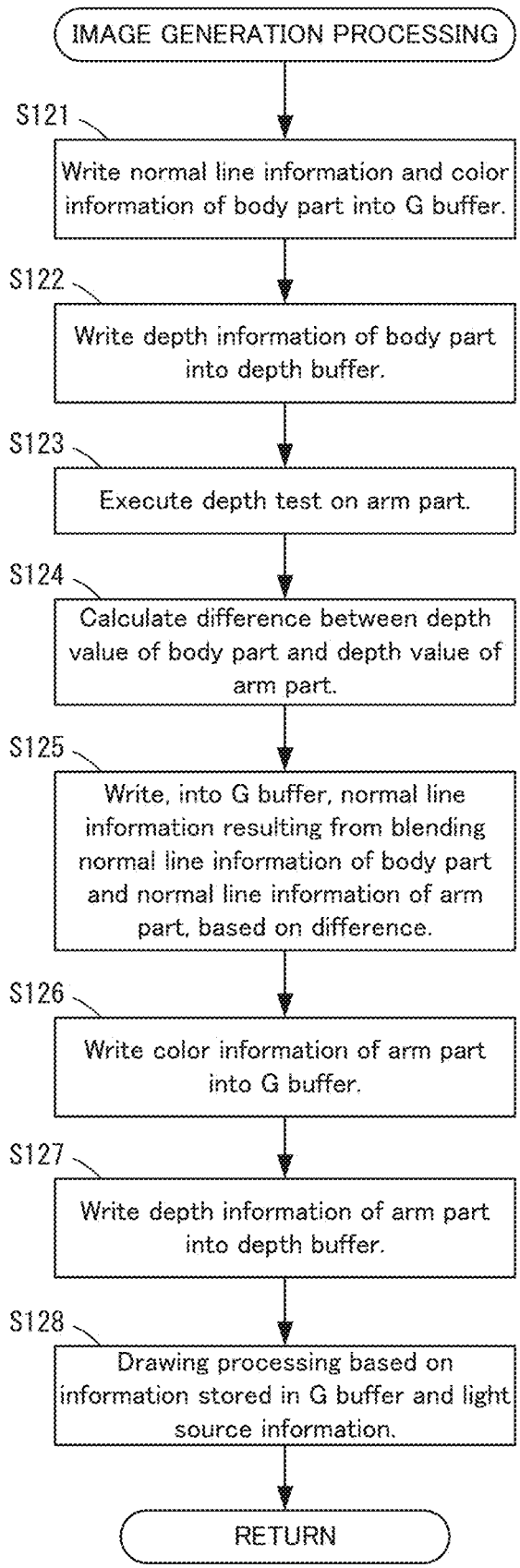
FIG. 9 is an example non-limiting flowchart showing the image generation processing of step S104.

Next, the image generation processing in step S104 is detailed below. FIG. 9 is a flowchart showing exemplary image generation processing of step S104. It should be noted that, although FIG. 9 deals with an exemplary case of generating an image of a virtual object 100 having the body part 101 and the arm part 102, the virtual object 100 may also have parts other than the body part 101 and the arm part 102. Further, although the same processing as for the virtual object 100 is also performed for other objects within the image capturing range of the virtual camera, description of the processing for the other objects is omitted.

In step S121, the processor 81 writes the normal line information and the color information of the body part 101 into the G buffer. Specifically, the processor 81 first performs a depth test to determine the front-back positional relationship of the objects. If there is no object on the front side of the body part 101 (on a side closer to the virtual camera), the processor 81 writes the normal line information of the body part 101 into the first G buffer and writes the color information of the body part 101 into the second G buffer. Further, the processor 81 writes the depth information of the body part 101 into the depth buffer (step S122).

Next, the processor 81 calculates the depth value of the arm part 102 and performs a depth test (step S123). If the depth value of the arm part 102 is smaller than the depth value of the body part 101 as the result of the depth test (if the arm part 102 is positioned closer to the virtual camera than the body part 101 is to the same), the processor 81 proceeds to a subsequent processing of step S124.

In step S124, the processor 81 reads the depth value of the body part 101 having been written into the depth buffer, and calculates a difference d between the depth value of the body part 101 and the depth value of the arm part 102 calculated in step S123. Here, the processor 81 calculates the depth value difference d between each pixel.

Next, the processor 81 writes, into the first G buffer, normal line information resulting from blending the normal line information of the body part 101 already stored in the first G buffer with the normal line information of the arm part 102, based on the depth value difference d (step S125). Specifically, the processor 81 calculates normal line information resulting from blending the normal line information of the body part 101 with the normal line information of the arm part 102 so that the proportion of the normal line information of the body part 101 already stored in the first G buffer increases with a decrease in the difference d. For example, the processor 81 calculates the normal line information of each pixel based on the above-described Formula 1. Then, the processor 81 writes the calculated normal line information into the first G buffer.

Next, the processor 81 writes the color information of the arm part 102 into the second G buffer (step S126). In this step, the processor 81 writes, into the second G buffer, color information resulting from blending the color information of the body part 101 already stored in the second G buffer with the color information of the arm part 102, based on the depth value difference d. Specifically, the processor 81 calculates color information resulting from blending the color information of the body part 101 with the color information of the arm part 102 so that the proportion of the color information of the body part 101 already stored in the second G buffer increases with a decrease in the difference d, and write the calculated color information into the second G buffer. It should be noted that, in step S126, the processor 81 may write the color information of the arm part 102 into the second G buffer without performing the above-described blend processing.

Next, the processor 81 writes the depth information of the arm part 102 into the depth buffer (step S127).

The processor 81 then performs drawing processing based on the information stored in the G buffer and the light source information (step S128). Specifically, the processor 81 renders an image in the frame buffer based on the normal line information, the color information, and the reflection information stored in the G buffer, the light source information, and the like. In the step, shading is calculated for each pixel based on the normal line information stored in the G buffer and the light source information, and a light reflection effect is further added based on the reflection information. Further, in addition to these sets of information, the processor 81 may render the image based on the roughness, the depth information, and the like. This way, an image with shading and reflection added is thus generated and stored in the frame buffer. This is the end of the description of the image generation processing shown in FIG. 9.

As described above, in the image generation processing of this exemplary embodiment, the processor 81 first writes, for the body part 101 (the first object) of the virtual object 100, the normal line information and the color information into the G buffer and the depth information into the depth buffer (steps S121 to S122). Then, for the arm part 102 (the second object), the processor 81 then writes the normal line information and the color information into the G buffer and the depth information into the depth buffer (steps S124 to S127). Specifically, when writing the normal line information of the arm part 102 into the G buffer (step S125), the processor 81 writes the normal line information of the arm part 102 into the G buffer (step S125) so that the normal line information of the body part 101 already stored in the G buffer is blended with the normal line information of the arm part 102 for a portion where the difference between the depth information of the arm part 102 and the depth information of the body part 101 already stored in the depth buffer is small. The processor 81 then renders an image based on the information written into the G buffer (normal line information, color information, and the like) and the light source information, and stores the image in the frame buffer.

Thus, by blending the normal line information of the body part 101 and arm part 102 for a portion where the depth values of the body part 101 and the arm part 102 are close, it is possible to generate an image with a less conspicuous connecting portion between the body part 101 and the arm part 102, allowing the arm part 102 to fit in with the body part 101.

It should be noted that blend processing similar to the one described hereinabove may be performed not only for the normal line information and the color information, but also for the reflection information. For example, based on the depth value difference d, a value in which a reflection-related parameter of the body part 101 and the reflection-related parameter of the arm part 102 are blended is calculated. If the reflection-related parameter value of the body part 101 and that of the arm part 102 are significantly different in the connecting portion between the body part 101 and the arm part 102, these parameter values are blended to be close to each other. This allows a less conspicuous connecting portion between the body part 101 and the arm part 102, and allows the arm part 102 to fit in with the body part 101.

Modification

Image processing of this exemplary embodiment is thus described hereinabove. It should be noted that the above-described exemplary embodiment is no more than an example, and for example, the following modifications are possible.

For example, the above-described exemplary embodiment deals with a case where the body part 101 is first written into the G buffer, and then the arm part 102 is written into the G buffer. In another exemplary embodiment, the arm part 102 may be first written into the G buffer, and then the body part 101 may be written into the G buffer. In this case, the difference between the depth value of the arm part 102 already stored in the depth buffer and the depth value of the body part 101 is calculated at a time of writing the body part 101 into the G buffer. The normal line information of the body part 101 and the normal line information of the arm part 102 are blended so that the proportion of the normal line information of the arm part 102 already stored in the G buffer increases with a decrease in the difference. Then, the blended normal line information is written into the G buffer. This way, the closer a portion is to the connecting portion between the body part 101 and the arm part 102, the closer the normal line information of that portion of the body part 101 written later becomes to the normal line information of the arm part 102 already stored. This way, an image with the body part 101 that appears to fit in with the arm part 102 is displayed. The same applies to a case of blending the color information, the reflection information, or the like.

Further, the above-described exemplary embodiment deals with a case where the body part 101, which is one portion of the virtual object 100, is written into the G buffer, and then the arm part 102, which is another portion of the same virtual object 100, is written into the G buffer. In another exemplary embodiment, the first object may be written into the G buffer, and then the second object may be written into the G buffer. When writing the second object into the G buffer, the blend processing may be performed in accordance with the difference in the depth information, as described above.

That is, the processor 81 may write the color information and the normal line information of the first object into the G buffer, write the depth information of the first object into the depth buffer, and then write the color information and the normal line information of the second object to the G buffer, and write the depth information of the second object to the depth buffer. When writing the normal line information of the second object into the G buffer, the processor 81 may calculate a difference between the depth information of the first object already stored in the depth buffer and the depth information of the second object and write, into the G buffer, the normal line information in which the normal line information of the first object and the normal line information of the second object are blended so that the proportion of the normal line information of the first object already stored in the G buffer increases with a decrease in the difference.

The shapes of the first object and the second object are not limited to a smooth curved shape as in the case of the body part 101 and the arm part 102 described above and may be any given shape. For example, the first object and the second object may have a shape having angles such as a cube. Further, the first object and the second object are not limited to a part of a character object and may be any object. The first object and the second object may be separate objects.

Further, the above-described exemplary embodiment deals with a case where the normal line information of the body part 101 and the normal line information of the arm part 102 are blended at a blend ratio according to the depth value difference. In another exemplary embodiments, the normal line information of the body part 101 and the normal line information of the arm part 102 may be blended at a predetermined blend ratio, if the depth value difference is within a predetermined range. That is, the normal line information of the body part 101 and the normal line information of the arm part 102 may be blended at a single blend ratio (for example, 50%) for pixels with the depth value difference within the predetermined range. The same applies to the color information, the reflection information, and the like.

Further, in another exemplary embodiment, the above-described blend processing may be performed only for the normal line information, the above-described blend processing may be performed only for the color information, or the above-described blend processing may be performed only for the reflection information.

Further, the above-described exemplary embodiment deals with a case where the depth information is written into the depth buffer; however, in another embodiment, the depth information may be written into the G buffer. Further, the information written into each of the buffers may be written into another buffer.

The above deals with a case where the deferred rendering is used to render an image; however, forward rendering may be used to render an image. Depending on the scene of the game of this exemplary embodiment, there may be a case of using the deferred rendering to render the image and a case of using the forward rendering to render the image. For example, the deferred rendering may be used to render the image in a scene with a plurality of light sources in the virtual space, and the forward rendering may be used to render the image in another scene with relatively few light sources.

In the case of using the forward rendering to render the image, the image may be rendered using the normal line information resulting from blending according to the depth value difference, as described above. Specifically, first, the depth value is written into the depth buffer for the first object, the normal line information is written into the normal line buffer that stores normal line information, and the image is drawn in the frame buffer. Then, the difference between the depth value of the second object and the depth value stored in the depth buffer may be calculated for the second object at a time of rendering the image in the frame buffer, and the normal line information of the second object and the normal line information already stored in the normal line buffer may be blended for the portion where the difference is small, and the image may be rendered based on the blended normal line information. In this case, the normal line information may be blended at a blend ratio according to the depth value difference, or the normal line information may be blended at a predetermined blend ratio for a pixel where the depth value difference is within a predetermined range.

Additionally, in the case of using the forward rendering to render the image, the color information of each object (the image of each object) may be blended according to the depth value difference as described above. Specifically, first, the depth value is written into the depth buffer for the first object, and an image of the first object (an image to which a shading has been added) is drawn in the frame buffer. Then, the difference between the depth value of the second object and the depth value stored in the depth buffer (the depth value of the first object) may be calculated for the second object at a time of drawing the image in the frame buffer, and the image of the second object and the image already stored in the frame buffer (the image of the first object) may be blended for the portion where the difference is small. At the time of blending the two images, the color information (e.g., the RGB value) may be blended at a blend ratio according to the depth value difference, as described above. Further, the color information may be blended at a predetermined blend ratio for pixels where the depth value difference is within the predetermined range.

Further, although the above-described exemplary embodiment deals with a case of performing a game involving the virtual object 100, the use of the above-described image generation processing is not limited to the game image, and may be used at a time of generating any image.

The configuration of hardware is merely an example. Alternatively, the above image generation processing may be performed by any other piece of hardware. For example, the above processing may be executed in any information processing apparatus such as a personal computer, a tablet terminal, a smartphone, or a server on the Internet. Further, the above processing may be executed by an information processing system including a plurality of apparatuses.

The configurations of the above exemplary embodiment and its variations can be optionally combined together unless they contradict each other. Further, the above description is merely an example of the exemplary embodiment, and may be improved and modified in various manners other than the above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium storing an image processing program configured to cause a computer of an information processing apparatus to generate an image of an object in a virtual space based on deferred rendering, wherein the image processing program causes the computer to:
   perform first processing including at least writing of depth information of a first object into a depth buffer, writing of normal line information of the first object into a first buffer, and writing of color information of the first object into a second buffer;
   after the first processing, perform a depth test on a second object in the virtual space and second processing including at least writing of the depth information of the second object into the depth buffer, writing of the normal line information of the second object into the first buffer, and writing of the color information of the second object into the second buffer;
   at a time of writing the normal line information of the second object into the first buffer in the second processing, write the normal line information of the second object into the first buffer so that, based on a difference between the depth information of the second object and the depth information already stored in the depth buffer, the normal line information of the second object is blended with the normal line information already stored in the first buffer for a portion where the difference is small; and generate an image by rendering based on information stored in at least the first buffer and the second buffer.

2. The non-transitory computer-readable storage medium of claim 1 storing the image processing program, wherein the image processing program causes the computer to write blended normal line information into the first buffer at a time of writing the normal line information of the second object into the first buffer, the blended normal line information obtained by blending the normal line information of the second object with the normal line information already stored in the first buffer at a blend ratio according to the difference.

3. The non-transitory computer-readable storage medium of claim 2 storing the image processing program, wherein the blend ratio is set so that a proportion of the normal line information already stored in the first buffer increases with a decrease in the difference.

4. The non-transitory computer-readable storage medium of claim 2 storing the image processing program, wherein the image processing program further causes the computer to at a time of writing the color information of the second object into the second buffer, write the color information of the second object into the second buffer so that, based on the difference, the color information of the second object is blended with the color information already stored in the second buffer for the portion where the difference is small.

5. The non-transitory computer-readable storage medium of claim 2 storing the image processing program, wherein:
the first object is a first part of a character; and
the second object is a second part of the character.

6. The non-transitory computer-readable storage medium of claim 1 storing the image processing program, wherein the image processing program causes the computer to write blended normal line information into the first buffer at a time of writing the normal line information of the second object into the first buffer, the blended normal line information obtained by blending the normal line information of the second object with the normal line information already stored in the first buffer at a predetermined blend ratio for a pixel where the difference is within a predetermined range.

7. A non-transitory computer-readable storage medium storing an image processing program for causing a computer of an information processing apparatus to generate an image of an object in a virtual space, wherein the image processing program causes the computer to:

perform first processing including at least writing of depth information of a first object into a depth buffer, writing of normal line information of the first object into a normal line buffer, and drawing of the first object into a frame buffer;

after the first processing, perform a depth test on a second object in the virtual space and second processing including drawing of the second object in the frame buffer; and in the drawing of the second object in the frame buffer in the second processing, calculate normal line information so that, based on a difference between the depth information of the second object and the depth information already stored in the depth buffer, the normal line information of the second object is blended with the normal line information already stored in the normal line buffer for a portion where the difference is small and perform rendering based on the calculated normal line information.

8. An image processing system, comprising at least one processor, to generate an image of an object in a virtual space based on deferred rendering, wherein the at least one processor is configured to:

perform first processing including at least writing of depth information of a first object into a depth buffer, writing of normal line information of the first object into a first buffer, and writing of color information of the first object into a second buffer;

after the first processing, perform a depth test on a second object in the virtual space and second processing including at least writing of the depth information of the second object into the depth buffer, writing of the normal line information of the second object into the first buffer, and writing of the color information of the second object into the second buffer;

at a time of writing the normal line information of the second object into the first buffer in the second processing, write the normal line information of the second object into the first buffer so that, based on a difference between the depth information of the second object and the depth information already stored in the depth buffer, the normal line information of the second object is blended with the normal line information already stored in the first buffer for a portion where the difference is small; and generate an image by rendering based on information stored in at least the first buffer and the second buffer.

9. The image processing system of claim 8, wherein the at least one processor is configured to write blended normal line information into the first buffer at a time of writing the normal line information of the second object into the first buffer, the blended normal line information obtained by blending the normal line information of the second object with the normal line information already stored in the first buffer at a blend ratio according to the difference.

10. The image processing system of claim 9, wherein the blend ratio is set so that a proportion of the normal line information already stored in the first buffer increases with a decrease in the difference.

11. The image processing system of claim 9, wherein the at least one processor is further configured to at a time of writing the color information of the second object into the second buffer, write the color information of the second object into the second buffer so that, based on the difference, the color information of the second object is blended with the color information already stored in the second buffer for the portion where the difference is small.

12. The image processing system of claim 9, wherein:
the first object is a first part of a character; and
the second object is a second part of the character.

13. The image processing system of claim 8, wherein the at least one processor is configured to write blended normal line information into the first buffer at a time of writing the normal line information of the second object into the first buffer, the blended normal line information obtained by blending the normal line information of the second object with the normal line information already stored in the first buffer at a predetermined blend ratio for a pixel where the difference is within a predetermined range.

14. An image processing system, comprising at least one processor, to generate an image of an object in a virtual space, wherein the at least one processor is configured to:
perform first processing including at least writing of depth information of a first object into a depth buffer, writing of normal line information of the first object into a normal line buffer, and drawing of the first object into a frame buffer;
after the first processing, perform a depth test on a second object in the virtual space and second processing including drawing of the second object in the frame buffer; and
in the drawing of the second object in the frame buffer in the second processing, calculate normal line information so that, based on a difference between the depth information of the second object and the depth information already stored in the depth buffer, the normal line information of the second object is blended with the normal line information already stored in the normal line buffer for a portion where the difference is small and perform rendering based on the calculated normal line information.

15. An image processing apparatus, comprising at least one processor, to generate an image of an object in a virtual space based on deferred rendering, wherein the at least one processor is configured to:
perform first processing including at least writing of depth information of a first object into a depth buffer, writing of normal line information of the first object into a first buffer, and writing of color information of the first object into a second buffer;
after the first processing, perform a depth test on a second object in the virtual space and second processing including at least writing of the depth information of the second object into the depth buffer, writing of the normal line information of the second object into the first buffer, and writing of the color information of the second object into the second buffer;
at a time of writing the normal line information of the second object into the first buffer in the second processing, write the normal line information of the second object into the first buffer so that, based on a difference between the depth information of the second object and the depth information already stored in the depth buffer, the normal line information of the second object is blended with the normal line information already stored in the first buffer for a portion where the difference is small; and
generate an image by rendering based on information stored in at least the first buffer and the second buffer.

16. The image processing apparatus of claim 15, wherein the at least one processor is configured to
write blended normal line information into the first buffer at a time of writing the normal line information of the second object into the first buffer, the blended normal line information obtained by blending the normal line information of the second object with the normal line information already stored in the first buffer at a blend ratio according to the difference.

17. The image processing apparatus of claim 16, wherein the blend ratio is set so that a proportion of the normal line information already stored in the first buffer increases with a decrease in the difference.

18. The image processing apparatus of claim 16, wherein the at least one processor is further configured to
at a time of writing the color information of the second object into the second buffer, write the color information of the second object into the second buffer so that, based on the difference, the color information of the second object is blended with the color information already stored in the second buffer for the portion where the difference is small.

19. The image processing apparatus of claim 16, wherein:
the first object is a first part of a character; and
the second object is a second part of the character.

20. The image processing apparatus of claim 15, wherein the at least one processor is configured to
write blended normal line information into the first buffer at a time of writing the normal line information of the second object into the first buffer, the blended normal line information obtained by blending the normal line information of the second object with the normal line information already stored in the first buffer at a predetermined blend ratio for a pixel where the difference is within a predetermined range.

21. An image processing method for generating an image of an object in a virtual space based on a deferred rendering, comprising:
performing a first step including at least writing of depth information of a first object into a depth buffer, writing of normal line information of the first object into a first buffer, and writing of color information of the first object into a second buffer;
after the first step, perform a depth test on a second object in the virtual space and a second step including at least writing of the depth information of the second object into the depth buffer, writing of the normal line information of the second object into the first buffer, and writing of the color information of the second object into the second buffer;
at a time of writing the normal line information of the second object to the first buffer in the second step, writing the normal line information of the second object into the first buffer so that, based on a difference between the depth information of the second object and the depth information already stored in the depth buffer, the normal line information of the second object is blended with the normal line information already stored in the first buffer for a portion where the difference is small; and
generating an image by rendering based on information stored in at least the first buffer and the second buffer.

22. The image processing method of claim 21, wherein blended normal line information is written into the first buffer at a time of writing the normal line information of the second object into the first buffer, the blended normal line information obtained by blending the normal line information of the second object with the normal line information already stored in the first buffer at a blend ratio according to the difference.

23. The image processing method of claim 22, wherein the blend ratio is set so that a proportion of the normal line information already stored in the first buffer increases with a decrease in the difference.

24. The image processing method of claim 22, wherein, at a time of writing the color information of the second object into the second buffer, the color information of the second object is written into the second buffer so that, based on the difference, the color information of the second object is blended with the color information already stored in the second buffer for the portion where the difference is small.

25. The image processing method of claim 22, wherein:
the first object is a first part of a character; and
the second object is a second part of the character.

26. The image processing method of claim 21, wherein blended normal line information is written into the first buffer at a time of writing the normal line information of the second object into the first buffer, the blended normal line information obtained by blending the normal line information of the second object with the normal line information already stored in the first buffer at a predetermined blend ratio for a pixel where the difference is within a predetermined range.

\* \* \* \* \*